3,328,487
GRAFTING OF A VINYL MONOMER ONTO A POLYVINYL AROMATIC SUBSTRATE CONTAINING MERCURY

Darrell C. Feay, Orinda, and Teddy G. Traylor, La Jolla, Calif., assignors to The Dow Chemical Company, Midland, Mich., a corporation of Delaware
No Drawing. Filed Sept. 27, 1963, Ser. No. 311,949
19 Claims. (Cl. 260—877)

This invention relates to a process for grafting olefinic polymer chains on substrates of polyvinylaromatic polymers, and the copolymers derived thereby. More specifically, it relates to a process where the copolymerization grafting of olefinic compounds is effected on a mercurated vinylaromatic polymer.

Considerable work has been done in the art on the grafting of styrene polymeric chains onto a polyolefin substrate. Such grafting is effected through the non-aromatic carbon atoms of the styrene. Very often such copolymers have been prepared to add aromatic groups to the polyolefin in order to make the polyolefin receptive to certain types of reactions which can be effected on aromatic rings. However, such copolymers are not isotactic and do not possess certain other desirable properties.

For many purposes, it would be desirable to have a substrate of a vinylaromatic polymer and then have the basic properties of such polymer modified by properties generally associated with polyolefins. However, attempts to graft olefin side chains onto a polyaromatic substrate generally results in a high proportion of polyolefin being formed which is not grafted to the polyaromatic substrate. In other cases, the means for grafting olefinic side chains is not adapted to producing long enough olefinic side chains to impart the desired polyolefinic properties. Also, in other cases, the olefinic side chains are not produced in a manner to produce crystallinity or isotactic properties therein.

In accordance with the present invention, it has now been found that graft copolymers of crystalline linear polyolefinic side chains can be attached to a continuous polyvinylaromatic substrate by employing a mercurated vinylaromatic polymer as the substrate in graft-polymerizing olefinic monomers thereon by means of catalysts and conditions well known in the art to produce crystalline polymers or isotactic polymers. The mercurated vinylaromatic polymers used in the practice of this invention consist of vinylaromatic polymers in which some of the hydrogen atoms of the polymer are replaced by anionic mercury salts. These mercurated vinylaromatic polymers serve as an organo-metallic component in a 3-component, olefinpolymerization catalyst which is used in effecting the graft-polymerization described herein. The mercury-containing aromatic polymers used herein are characterized by a mercury-carbon bond in which the mercury can be bonded to any of the carbon atoms therein including those in the vinyl chain as well as those in the aromatic nucleus.

The mercurated polymers that can be used in practice of this invention include any aryl or heterocyclic pseudo-arylpolymer containing a carbon-bonded mercury. Typical polymers are those in which at least 50 percent of the polymer is derived from styrene, vinyl toluene, vinyl pyridine, alphamethyl styrene, vinylbenzyl sulphonate, dimethyl styrene, vinyl naphthalene, vinyl diphenyl, vinyl chlorobenzene, vinyl ethylbenzene, vinyl chloronaphthalene, vinyl chlorodiphenyl, etc. as well as various types of condensation polymers having aromatic nuclei therein.

Typical of such polymers are the mercurated derivatives of polystyrene, sulfonated polystyrene, polyvinyltoluene, polyvinylpyridine, polyalphamethylstyrene, polyvinylbenzylsulfonate, copolymers of styrene and divinylbenzene, copolymers of styrene and acrylonitrile, copolymers of styrene and methylmethacrylate, copolymers of styrene sulfonic acid and vinyl pyridine, polychlorostyrene, poly-N-vinylcarbazole, poly-N-vinylpyrrole, phenolaldehyde (especially phenolformaldehyde) condensation polymers, resorcinol resins, styrene polyesters, diallyl phthalate resins, bisphenol epoxies, styrene-butadiene copolymers, ethylene glycol terephthalate polyesters ("Dacron," "Mylar," etc.), etc. The molecular weight of the polymer suitable for use in the invention can vary over a wide range such as from 1,000 to as high as 600,000 or even higher.

Preferred polymers of this type are the polymers of vinylaromatic hydrocarbons, preferably those having no more than 12 carbon atoms therein. Even with respect to such polymers which have derivative groups other than hydrocarbon, it is generally preferred that there are no more than 12 carbon atoms in the monomeric group. Preferred vinyl aromatic polymers are the vinyl and alphamethyl vinyl derivatives of benzene, naphthalene and diphenyl in which there are no more than one other derivative group on the aromatic nucleus and this derivative group is selected from the class of hydrocarbon, halogen, alkoxy, aryloxy and acyloxy radicals.

The olefinic compounds which can be grafted in accordance with the practice of this invention are the alpha-olefins and derivatives thereof. Such compounds can be represented by the formula $CH_2=CHR$, wherein R is hydrogen, —COOR′, —CONR′$_2$, —CN or an aromatic, aliphatic or cycloaliphatic hydrocarbon radical or the —COOR′, —CONR′$_2$ or —CN derivative of such hydrocarbon radical, wherein R′ represents a hydrocarbon group as listed for R. The R radicals preferably have no more than 12 carbon atoms and can include unsaturated groups such as ethylenic, acetylenic and cycloalkenyl groups. The —COOR′, —CONR′$_2$ and —CN derivatives advantageously have no more than one such derivative group per mole.

Typical olefinic compounds suitable for the grafting operation of this invention include, but are not restricted to, the following: ethylene, propylene, butene-1 pentene-1, octene-1, 4-methyl-pentene-1, 5-propyl-octene-1, n-decene-1, n-dodecene-1, 4-ethyl-nonene-1, styrene, vinyltoluene, 2-ethylstyrene, 2-isopropylstyrene, vinylnaphthalene, allylbenzene, 3-phenyl-butene-1, 4-tolyl-pentene-1, vinylcyclohexane, vinylcyclohexene, vinylcyclopentane, allylcycohexane, allylcyclopentane, 3-cycohexyl-butene-1, methyl propenoate, ethyl 2-vinyl-acetate, butadiene-1,3, divinylbenzene, allylcyclohexane, propargylstyrene, vinylacetylene, methyl p-vinylbenzoate, ethyl (vinylphenyl)-acetate, methyl vinylcyclohexanoate, propyl p-allylbenzoate, methyl acrylate, ethylacrylate, phenylacrylate, benzylacrylate, cyclohexyl acrylate, cyclopentyl acrylate, phenethyl acrylate, tolyl acryate, dodecy acrylate, octyl acrylate, N,N - dimethylacrylamide, N,N-diethylacrylamide, N,N-dibenzylacrylamide, N,N-diphenylacrylamide, N,N-dicyclohexylacrylamide, acrylonitrile, allyl cyanide, ar-cyanostyrene, 4-cyano-vinylcyclohexane, 3-cyano-butene-1, p-vinyl-benzylcyanide, allyl-benzylcyanide, etc.

The mercury content of the mercurated polymer suitable for the practice of this invention is preferably in the range of 0.01% to 50% by weight based on the entire weight of the mercurated vinylaromatic polymer.

The physical properties of the mercurated polymer products depend to a great extent upon their particular degrees of mercuration. Thus, at relatively low levels of combined mercury, the products of the polymeric mercury compounds may frequently be found to be about the same as those of the corresponding unmodified polymers. Relatively greater degrees of mercuration generally produce products that are higher melting, harder and more dense than the corresponding unmodified polymers.

The catalyst system used in conjunction with the mercurated polymeric substrate in effecting grafting of the olefinic compound thereto comprises a transition metal salt component and a Lewis acid such as $R''AlX_2$ (wherein $R''$ is hydrogen, alkyl, cycloalkyl and aryl, preferably of no more than 12 carbon atoms and X is a radical selected from the class consisting of $OR'$, Cl, Br, F and I, and $R'$ is alkyl, cycloalkyl or aryl, preferably of no more than 12 carbon atoms), $BF_3$, $ZnHa_2$, $SnHa_4$ and $MHa_3$ wherein Ha is a halide selected from the class consisting of Cl, Br and I, and M is a trivalent metal selected from the class consisting of trivalent Al, Fe, Bi and Sb.

Typical examples of such Lewis acids are: $HAlCl_2$, $HAlBr_2$, $HAlI_2$, $HAlF_2$, $CH_3AlCl_2$, $C_2H_5AlBr_2$, $C_3H_7AlI_2$,
$C_4H_9AlF_2$, $C_6H_5AlF_2$, $C_6H_{11}AlCl_2$, $C_6H_5CH_2AlCl_2$
$CH_3C_6H_4AlBr_2$, $C_2H_5C_6H_4AlI_2$, $C_{10}H_7AlF_2$
$C_6H_{11}CH_2AlCl_2$, $C_8H_{17}AlCl_2$, $C_{12}H_{23}AlCl_2$
$CH_3Al(OC_3H_7)_2$, $C_2H_5Al(OC_8H_{17})_2$, $C_4H_9Al(OC_4H_9)_2$,
$C_6H_5Al(OC_6H_5)_2$, $C_6H_5CH_2Al(OCH_2C_6H_5)_2$
$HAl(OC_5H_{11})_2$, $AlCl_3$, $FeCl_3$, $BiCl_3$, $SbCl_3$, $SnCl_4$, $AlBr_2$, $AlI_3$, $FeBr_3$, $FeI_3$, $ZnCl_2$, $ZnBr_2$, $ZnI_2$, $SnBr_4$, $SnI_4$, $BiBr_3$, $BrI_3$, $SbBr_3$, $SbI_3$, etc.

The transition metal compound includes the halides, oxides, alcoholates and esters of metals of the periodic groups IV(B), V(B) and VI(B). Typical examples of this component are: $TiCl_4$, $TiCl_3$, $TiCl_2$, $TiBr_3$, $TiF_3$, $TiI_4$, $Ti(OC_4H_9)_4$, $Ti(OC_6H_5)_4$, $TiO_2$, $Ti(OCl)_2$, titanium acetylacetonate, $TiCl_2(OCH_3)_2$, $ZrO_2$, $ZrCl_4$, $ZrCl_3$, $HfCl_4$, zirconium acetylacetonate, vanadium oxyacetylacetonate, $NbCl_3$, $TaCl_4$, $CrCl_2$, chromium acetylacetonate, $MoCl_5$, $WCl_6$, $Zr(OC_4H_9)_4$, $Va(OC_3H_7)_4$, Nb acetylacetonate, $Ti(OOCCH_3)_4$, $TiCl_2(OOCCH_3)_2$, $ZrO(OOCCH_3)_2$
$Cr(OOCC_6H_5)_2$, $MoCl_3(OCH_3)_2$, etc.

Where the transition metal salt component of the catalyst is a salt of vanadium, $R''AlX_2$ gives an undesirable amount of homopolymer of the olefinic compound. In such cases, it is preferable to use one of the other forms of Lewis acids such as $MHa_3$, e.g., $AlCl_3$, $FeCl_3$, $ZnCl_2$, etc., as the Lewis acid component to avoid large proportions of such homopolymer in the product.

Particularly preferred catalyst components of this type are a titanium halide having a valency of at least 2, advantageously a chloride, e.g., $TiCl_2$, $TiCl_3$, etc., and an alkyl aluminum dihalide, preferably one in which the alkyl group has no more than 12 carbon atoms such as $C_2H_5AlCl_2$, $CH_3AlCl_2$, $C_3H_7AlCl_2$, $C_4H_9AlCl_2$
$C_6H_5AlCl_2$, $C_6H_5C_2H_4AlCl_2$, etc. Particularly suitable in such combinations are the alpha and beta forms of titanium trichloride.

On the basis of one liter of solvent, the following proportions of reagent are advantageous: 4–50 millimoles, preferably about 5–15 millimoles of mercury present in the form of the mercurated polymer; 2.5–100 millimoles, preferably about 10–15 millimoles of the transition metal compound; and 2.5–200 millimoles, preferably about 40–60 millimoles, of the Lewis acid.

The proportion of olefinic compound to be used on the basis of the vinylaromatic polymer will depend on the particular properties and use desired for the products. However, the resultant copolymer can contain 5–95 percent of the copolymerized olefinic compound, preferably about 20–40 percent for most purposes. Where the products are to be used as a high impact strength polystyrene, an olefinic compound content of 5–10 percent by weight in the copolymer is generally preferred.

The copolymers prepared according to the practice of this invention have melting points of 128° C. and higher. These products are glossy solids with about 67 percent crystallinity. Of course, these properties will vary according to the particular olefinic compound being grafted.

The invention is best illustrated by the following examples. These examples are not intended in any way to restrict the scope of the invention nor the manner in which it can be used and are given merely for illustrative purposes. In these examples and throughout the specification, parts and percentages are given as parts and percentages by weight respectively, except where specifically provided otherwise.

EXAMPLE I

Twenty-one grams (0.20 monomer mole) of about 60,000 M.W. polystyrene is dissolved in 150 ml. of nitrobenzene containing 10 ml. of glacial acetic acid. This solution is treated with stirring at 110° C. with 63 grams (0.20 mole) of mercuric acetate in about 30 small portions over a period of 4 hours, and the temperature is maintained at 110° C. for another 2 hours. (If the mercuration is carried out in the absence of acetic acid, some gellation occurs.) The polymer is precipitated twice in methanol, washed, and dried. It melts at about 300° C. with decomposition and gives no mercuric oxide in alkali. The mercurated polymer is soluble in nitrobenzene or nitromethane (either solvent containing a little acetic acid), and insoluble in toluene, benzene, or alcohols.

EXAMPLE II

The procedure of Example I is repeated a number of times using in place of the mercuric acetate an equivalent amount of the mercuric benzene sulfonate, sulfate, benzene-phosphonate, phosphate, perchlorate, nitrate, p-tertiary butyl benzoate, iso-butyrate and propionate respectively. The corresponding mercury derivatives of the polystyrene are prepared.

EXAMPLE III

To a solution of 32 grams poly-sodium-p-vinylbenzyl-sulfonate (prepared by polymerizing sodium-p-vinyl-benzylsulfonate to 99% conversion with 2 mev. electrons) in 120 ml. water is added 15 grams mercuric oxide and 52 grams of 70% perchloric acid. The resulting solution is refluxed for 4 hours. Ten grams of sodium chloride in 70 ml. water are added to the solution and the resulting solution precipitated in a large excess of methanol. After washing with methanol and drying, the polymer product is found to contain 13.3% mercury.

EXAMPLE IV

The following mixture is refluxed for 8 hours with stirring:

20 grams mercuric oxide
25 grams 60–80 mesh Dowex 50 beads (8% crosslinked sulfonated styrene-divinylbenzene copolymer)
34 grams 70% perchloric acid
85 ml. water The Dowex beads are filtered from the solution and washed with water, the washings being added to the first filtrate. The solution contains, by analysis, 4.7 grams of HgO equivalent. Thus, 15.3 grams of HgO are added to the Dowex 50.

In place of the polystyrene and other starting polymers used in the above examples, the other polymeric materials indicated above are substituted to produce the other mercurated polymers used in the practice of this invention. Water-soluble starting polymers are mercurated according to the procedure of Example II whereas water-insoluble polymers are advantageously mercurated according to the procedure of either Example I or III.

EXAMPLE V

One liter of xylene and 8.83 grams of mercurated polystyrene (containing 4 millimoles of mercury and prepared according to Example I) are added to a dry, stainless steel reactor. The formula of the mercuated polystyrene is represented as:

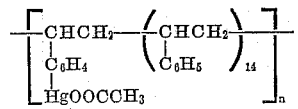

After purging the free space in the reactor with dry nitrogen, 10 millimoles of TiCl₄ and 40 millimoles of isobutyl aluminum dichloride are added. The reactor atmosphere is swept out with ethylene and then the reactor pressured to 50 p.s.i.g. with ethylene. The temperature of the reaction rises from 23° to 44° C. from the heat of reaction. After allowing the reaction to continue for an additional two hours (total reaction time of 4 hours), the reaction is stopped by the addition of methanol. Then the polymer is purified by boiling in a methanol-HCl solution and rinsing with methanol to remove HCl, and then dried. A yield of 50.2 grams of solid polymer is obtained. Infra-red data on a flashmolded film indicates that the polymer is 20 percent polystyrene and 80 percent grafted polyethylene. Infra-red analysis also indicates that 10-20 percent of the benzene rings are disubstituted, meaning that in addition to the attachment to the linear polymer chain, such rings have a polyethylene side chain grafted thereon. This material is partially crystalline in that 61 percent of the polyethylene present is crystalline. None of the polystyrene is crystalline. Twenty percent of the crude polymer is soluble in methyl ethyl ketone (MEK) whereas the amorphous polystyrene is 100 percent soluble in MEK. The insoluble residue, after 20 percent of the crude polymer has been dissolved, still contains about 20 percent polystyrene according to infra-red data. Similar results are obtained when toluene is used as the solvent instead of MEK.

EXAMPLE VI

The procedure of Example V is repeated except that 40 grams of mercurated polystyrene containing 15 millimoles of mercury is used together with 15 millimoles of TiCl₄ and 60 millimoles of isobutyl aluminum dichloride. The heat of reaction takes the polymerization temperature to 65° C. within one half hour. In this case the xylene solvent is decanted prior to the addition of the methanol. This xylene solution contains 6.1 grams of polymer which is shown by infra-red to be pure polystyrene. The 71.4 grams of polymer insoluble in the xylene reaction solvent is found to be 47.5 percent polystyrene and 52.5 percent grafted polyethylene. This grafted copolymer is partially crystalline in that the polyethylene is 46.2 percent crystalline with no crystallinity evident in the polystyrene.

EXAMPLE VII

The procedure of Example V is repeated using 10 millimoles of TiCl₄, 40 millimoles of isobutyl aluminum dichloride and 50 grams of a mercurated polystyrene containing 10 millimoles of mercury in the form of terminal HgCl groups. The formula of this polymer is

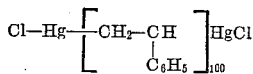

In this case a maximum temperature of 65° C. is reached in one half hour, the ethylene pressure is raised to 60 p.s.i.g. and the reaction run for 5 hours. When the product is processed as in Example II, 141.5 grams of crude polymer are obtained. This product is 35.3 percent polystyrene and at 135° C. the intrinsic viscosity in Decalin is 5.0. The grafted polyethylene is 51.0 percent crystalline while the polystyrene portion is completely amorphous. This crude polymer is 90 percent soluble in toluene. Infra-red shows that the toluene soluble fraction is 35 percent polystyrene and the insoluble residue is 25 percent polystyrene. By testing the crude polymer in other solvents, it is found that it is 37 percent soluble in acetone, 3 percent soluble in diethyl ether, and 5 percent soluble in n-heptane. It is apparent that the crude polymer is a mixture of copolymers ranging from mainly polystyrene to mainly polyethylene with possibly some homopolymer present also.

EXAMPLE VIII

To a stainless steel reactor are added 1 liter of xylene, 8.3 grams of a mercurated polystyrene containing 1 atom of Hg per 15 styrene repeating units (of the type shown in Example VII), 1.9 grams TiCl₄ and 10.7 grams of AlBr₃ (dissolved in cyclohexane). The reactor is purged with ethylene and pressured to 50 p.s.i.g. with ethylene. The heat of reaction raises the temperature to a maximum of 44° C. After polymerization for four hours, the ethylene pressure is released, the catalyst is deactivated by the addition of methanol and the polymer product is washed with HCl in isopropanol. Fifty grams of crude polymer are recovered. This crude polymer is extracted with methyl ethyl ketone to separate polystyrene from the copolymer. Twenty percent of the polymer product is thus extracted. The residue still contains about 20 percent polystyrene and about 10-20 percent of the phenyl rings therein are shown by infra-red to be disubstituted, indicating that a polyethylene side chain has been attached to that proportion of the rings.

EXAMPLE IX

The procedure of Example V is repeated a number of times with similar results using in place of the mercurated polystyrene equivalent weights of the corresponding mercurated polymers of vinyltoluene, alpha-methylstyrene, vinylnaphthalene, vinylpyridine, vinylbenzylsulfonate, a sulfonated copolymer of styrene and divinylbenzene, a phenol-formaldehyde resin, a diallylphthalate resin and an ethyleneglycol terephthalate polyester resin, and a styrene-ethylene glycol maleate copolymer resin respectively.

EXAMPLE X

The procedure of Example V is repeated using in place of the ethylene the following olefinic compounds respectively: propylene, pentene-1, styrene, ethylacrylate, acrylonitrile, dimethylacrylamide, vinylcyclohexane, and allylbenzene. In each case the olefinic compound is grafted to the polystyrene.

EXAMPLE XI

The procedure of Example X is repeated using in place of the catalyst compounds of this example equivalent proportions and amounts of the following catalyst combinations respectively: TiCl₃ and isopropyl aluminum dichloride; titanium acetylacetonate and AlCl₃; TiCl₂(OCH₃)₂ and FeCl₃; chromium acetylacetonate and C₆H₅CH₂AlCl₂; Ti(OC₄H₉)₄ and C₆H₁₁CH₂AlCl₂; and vanadium oxyacetylacetonate and AlCl₃. In each case satisfactory grafting of the ethylene is effected on the polystyrene.

EXAMPLE XII

In accordance with the procedure of Example V, a partially crystalline graft copolymer of propylene on polyvinylpyridine is prepared by reacting mercurated polyvinylpyridine with propylene in the presence of TiCl₃ and phenyl aluminum dichloride in toluene.

EXAMPLE XIII

By the procedure of Example V, a graft copolymer of butene-1 on poly-N-vinyl pyrrolidone is prepared in good yield by reacting mercurated polyvinylpyrrolidone with butene-1 in the presence of MoCl₅ and ethylaluminumdichloride.

The polymeric compositions prepared as shown above are particularly suitable as high impact polystyrenes. The polymeric ethylene side chains are also adaptable for the addition of reactive groups which make the polymers suitable for use as ion exchange resins, chelating agents, etc. For such purposes and various other uses which are obvious, various types of modifiers such as plasticizers, pigments, fillers, modifying resins, etc., can be added to modify the properties of these copolymer compositions in accordance with the particular use desired.

EXAMPLE XIV

The procedure of Example V is repeated with satisfactory results using, in place of the TiCl₄-C₄H₉AlCl₂ catalyst, equivalent amounts of the following catalyst combinations:

TiBr$_3$-C$_4$H$_9$AlCl$_2$;
TiI$_3$-C$_6$H$_5$AlF$_2$;
ZrCl$_4$-C$_5$H$_{11}$AlBr$_2$;
Zr acetylacetonate-FeCl$_3$;
Zr(OC$_4$H$_9$)$_4$-ZnCl$_2$;
HfCl$_4$-CH$_3$Al(OC$_3$H$_7$)$_2$;
NbCl$_3$-C$_2$H$_5$Al(OC$_6$H$_5$)$_2$;
TaCl$_4$-C$_2$H$_5$AlBr$_2$;
CrCl$_2$-C$_6$H$_5$CH$_2$AlF$_2$;
MoCl$_5$-C$_6$H$_5$Al(OC$_6$H$_5$)$_2$;
WCl$_6$-CH$_3$Al(OC$_4$H$_9$)$_2$;
Ti(OOCCH$_3$)$_4$-C$_2$H$_5$AlI$_2$;
MoCl$_3$(OCH$_3$)$_2$-HAl(OC$_5$H$_{11}$)$_2$;
V(OC$_3$H$_7$)$_4$-SnCl$_4$; and
Zr(OC$_6$H$_5$)$_4$-SbCl$_3$.

While certain features of this invention have been described in detail with respect to various embodiments thereof, it will, of course be apparent that other modifications can be made within the spirit and scope of this invention, and it is not intended to limit the invention to the exact details shown above except insofar as they are defined in the following claims.

The invention claimed is:

1. A process for producing a grafted copolymer of a polymer having aromatic nuclei therein comprising the step of polymerizing
    (a) an olefinic compound having the formula $$CH_2=CHR$$

wherein R is selected from the class consisting of hydrogen, —COOR′, —CONR′$_2$, —CN, and aromatic, aliphatic and cycloaliphatic hydrocarbon radicals and derivatives of said hydrocarbon radicals having only derivative groups selected from the class consisting of —COOR′, —CONR′$_2$ and —CN groups in which R′ is a group selected from the class consisting of alkyl, aryl, aralkyl alkaryl and cycloalkyl groups, said R group having no more than 12 carbon atoms therein, said olefinic compound being polymerized while in intimate contact with:
    (b) said polymer having aromatic nuclei therein and having at least one mercury atom directly connected to a carbon atom of said polymer,
    (c) a catalyst compound selected from the class consisting of the halides, oxides, alcoholates, and esters of metals of the periodic groups IV(B), V(B), VI(B), and
    (d) a Lewis acid selected from the class consisting of R″AlX$_2$, BF$_3$, ZnHa$_2$, SnHa$_4$ and MHa$_3$, wherein X is a member of the class consisting of OR′, Cl, Br, F and I, R′ is a radical selected from the class consisting of alkyl, cycloalkyl and aryl radicals of no more than 12 carbon atoms, R″ is a member of the class consisting of hydrogen and R′ radicals, M is a trivalent metal selected from the class consisting of trivalent Al, Fe, Bi and Sb, and Ha is a halogen selected from the class of Cl, Br and I, said Lewis acid being selected from the class of BF$_3$, ZnHa$_2$, SnHa$_4$ and MHa$_3$ when said catalyst compound is a vanadium compound.

2. A process of claim 1 in which said aromatic polymer is polystyrene.
3. A process of claim 1 in which said aromatic polymer is polyvinyltoluene.
4. A process of claim 1 in which said aromatic polymer is poly-alpha-methylstyrene.
5. A process of claim 1 in which said aromatic polymer is polyvinylnaphthalene.
6. A process of claim 1 in which said aromatic polymer is polyvinylpyridine.
7. A process of claim 1 in which said aromatic polymer is polyvinylbenzylsulfonate.
8. A process of claim 1 in which said aromatic polymer is a sulfonated copolymer of styrene and divinylbenzene.
9. A process of claim 1 in which said olefinic compound is ethylene.
10. A process of claim 9 in which said component (c) is TiCl$_4$ and said component (d) is a Lewis acid of the formula R″AlCl$_2$.
11. A process of claim 10 in which R″AlCl$_2$ is isobutyl aluminum dichloride.
12. A process of claim 11 in which said aromatic polymer is polystyrene.
13. A process of claim 10 in which said aromatic polymer is polystyrene.
14. A process of claim 1 in which said olefinic compound is propylene.
15. A process of claim 14 in which said component (c) is TiCl$_4$ and said component (d) is a Lewis acid of the formula R″AlCl$_2$.
16. A process of claim 1 in which said olefinic compound is butene-1.
17. A process of claim 16 in which said component (c) is TiCl$_4$ and said component (d) is a Lewis acid of the formula R″AlCl$_2$.
18. A process of claim 10 in which said aromatic polymer is a sulfonated copolymer of styrene and divinylbenzene.
19. A process of claim 11 in which said aromatic polymer is a sulfonated copolymer of styrene and divinylbenzene.

References Cited

UNITED STATES PATENTS 3,187,067  6/1965  Beredjick _____ 260—878
3,215,681  11/1965  Volans _____ 252—429

MURRAY TILLMAN, *Primary Examiner.*

GEORGE F. LESMES, D. J. BREZNER,
*Assistant Examiners.*